US010865529B2

(12) United States Patent
Avans et al.

(10) Patent No.: US 10,865,529 B2
(45) Date of Patent: *Dec. 15, 2020

(54) MILLING MACHINE CONTROL SYSTEM

(71) Applicant: Roadtec, Inc., Chattanooga, TN (US)

(72) Inventors: Todd Avans, Soddy Daisy, TN (US); James H. Bevill, Lookout Mountain, GA (US); David Swearingen, Ooltewah, TN (US)

(73) Assignee: Roadtec, Inc., Chattanooga, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/810,249

(22) Filed: Mar. 5, 2020

(65) Prior Publication Data

US 2020/0199829 A1 Jun. 25, 2020

Related U.S. Application Data

(63) Continuation-in-part of application No. 16/596,271, filed on Oct. 8, 2019, now Pat. No. 10,655,286, which is a continuation-in-part of application No. 16/139,273, filed on Sep. 24, 2018, now abandoned.

(60) Provisional application No. 62/582,715, filed on Nov. 7, 2017.

(51) Int. Cl.
*E01C 23/088* (2006.01)
*E01C 23/12* (2006.01)
*G01G 19/12* (2006.01)

(52) U.S. Cl.
CPC .......... *E01C 23/088* (2013.01); *E01C 23/127* (2013.01); *G01G 19/12* (2013.01)

(58) Field of Classification Search
CPC .............................. E01C 23/088; E01C 23/127
See application file for complete search history.

(56) References Cited

U.S. PATENT DOCUMENTS

| 5,092,659 A | * | 3/1992 | Grathoff | .................... | E02F 3/24 |
| | | | | | 299/39.2 |
| 5,318,378 A | * | 6/1994 | Lent | ...................... | E01C 23/088 |
| | | | | | 404/75 |
| 5,879,056 A | * | 3/1999 | Breidenbach | ......... | E01C 23/088 |
| | | | | | 299/1.5 |
| 2016/0017552 A1 | * | 1/2016 | Berning | .................. | E21C 47/00 |
| | | | | | 299/1.5 |

(Continued)

*Primary Examiner* — Janine M Kreck
*Assistant Examiner* — Michael A Goodwin
(74) *Attorney, Agent, or Firm* — Chambliss, Bahner & Stophel, P.C.

(57) ABSTRACT

A milling machine includes a primary drum drive assembly for its milling drum, and a ground-engaging drive assembly for driving the milling machine along a roadway. A lifting column is attached between the frame and the ground-engaging drive assembly. The lifting column includes a linear actuator which can raise and lower the frame of the machine with respect to the roadway. A sensor mounted to the lifting column is adapted to determine if the lifting column is not supporting at least a predetermined portion of the weight of the milling machine. A controller is operatively attached to the drive assemblies and to the sensor, and is adapted to receive from the sensor a signal indicating that the lifting column is not supporting the predetermined portion of the weight of the milling machine. Upon receipt of such signal, the controller will automatically control certain machine functions.

18 Claims, 9 Drawing Sheets

(56) References Cited

U.S. PATENT DOCUMENTS

2016/0177522 A1\* 6/2016 Nacke ................. B60G 17/016
                                                                  299/1.5

\* cited by examiner

MILLING MACHINE CONTROL SYSTEM

CROSS-REFERENCE TO RELATED APPLICATION

This application is a continuation-in-part of U.S. patent application Ser. No. 16/596,271, which was filed on Oct. 8, 2019, which itself is a continuation-in-part of U.S. patent application Ser. No. 16/139,273 (now abandoned), which was filed on Sep. 24, 2018 and claims the benefit of U.S. Provisional Patent Application No. 62/582,715, which was filed on Nov. 7, 2017.

FIELD OF THE INVENTION

This invention relates generally to a system for automatically taking action to control a milling machine during the performance of a milling operation when the system anticipates that the machine drive assembly may lose traction and/or that the milling drum may experience a kick-back event. More particularly, the system allows for slowing or stopping a drive assembly of a milling machine during the performance of a milling operation when the system anticipates that the drive assembly may lose traction, and/or for stopping the rotation of the milling drum when the system anticipates that the milling drum may experience a kick-back event. The invention comprises a system for anticipating these adverse circumstances and for automatically taking control of certain machine operations when a lifting column to which a drive assembly is attached is not providing adequate support.

BACKGROUND AND DESCRIPTION OF THE PRIOR ART

This discussion of the Background of the Invention is intended to aid the reader in understanding the invention described herein, and should not be considered to be an exhaustive discussion of the prior art. Furthermore, the observations described herein relating to technical problems addressed by the inventors should not be read to indicate or imply that knowledge of such problems existed in the prior art.

Roadway repair is often accomplished by overlaying the existing pavement (whether of concrete or asphalt paving material) with a new layer (often called a leveling course) of concrete or asphalt paving material. Without prior surface treatment, however, this method of repair generally results in the application of insufficient quantities of paving material in the rutted, pot-holed or otherwise damaged areas, because the overlay will be applied at the same rate per unit of roadway width in damaged areas (which have a greater depth to be filled across the width) as in the undamaged areas. The resulting reduced thickness in the overlay of the previously damaged areas will lead to renewed rutting or other wear damage in the new pavement in relatively short order. However, by milling the surface of the damaged pavement to a uniform surface elevation below the level of the damage, the addition of new pavement will produce a road surface having a consistent elevation across the entire width of the roadway. This repaving technique can be used to return the elevation of a damaged roadway to its original pre-damaged elevation, whereas the placement of a leveling course atop damaged but un-milled pavement will tend to raise the surface of the roadway or some portion thereof above its original elevation. Roadway repair without milling can require the raising of road shoulders, guardrails and manhole covers and the adjustment of overpass clearances, all of which are unnecessary if a proper milling technique is employed. A use of milling prior to repaving can also permit ready establishment of the proper road grade and slope, and thereby avoid drainage and safety problems. Furthermore, milling typically provides a rough surface that readily accepts and bonds with the new asphalt or other pavement overlay. Finally, milling can provide raw material that can be reclaimed for use in the production of new paving materials.

A milling machine typically comprises a wheel-driven or track-driven vehicle that includes a milling drum having a plurality of cutting teeth disposed around its periphery. The milling drum is mounted for rotation about a substantially-horizontal axis within a drum housing on the frame of the machine. Steerable wheel-drive or track-drive assemblies typically operated by hydraulic motors are provided to drive the machine in a milling direction and to steer it along a desired milling path. The drive assemblies are attached to lifting columns that include internal linear actuators which can be activated to raise and lower the frame of the machine with respect to the roadway surface. Wheel-driven machines include four ground-engaging wheel-drive assemblies, one at the left front, one at the right front, one at the left rear and one at the right rear. Track-driven machines include three or four ground-engaging track-drive assemblies including one at the left front and one at the right front. Some such machines will also include a third track-drive assembly at the left rear and a fourth at the right rear; however, some track-drive machines will have only a single, center-mounted rear track-drive assembly. Each of the ground-engaging drive assemblies is operatively attached to or comprises a drive control system and is adapted to provide a driving force to drive the milling machine along the roadway surface. The drive control system typically comprises a hydraulic motor and a gearbox with an integrated friction brake. These hydraulic motors for the ground-engaging drive assemblies are part of a hydraulic circuit that includes a hydraulic fluid pump.

Since the milling drum is mounted for rotation in a housing on the frame of the machine, raising the frame on the lifting columns can raise the milling drum out of contact with the roadway surface, and lowering the frame on the lifting columns can lower the milling drum into contact with the road surface so as to make a cut of the desired depth. The milling drum is rotated by a primary drum drive assembly typically comprising a drive belt driven by a diesel engine, which drive belt engages a drivetrain comprising a sheave on an input drive shaft for the milling drum. A gear box is typically located between the sheave and the milling drum and includes a gear train and an output drive shaft on which the milling drum is rotated. The gear box thus allows for rotation of the output drive shaft for the milling drum at a speed and torque that is different from that of the input drive shaft. A milling machine may include a conveyor system that is designed to carry the milled material that has been cut from the roadway by the rotating milling drum to a location in front of, to the rear of, or beside the machine for deposit into a truck for removal from the milling site. Power for operation of the hydraulic motors that are typically employed to operate the conveyors and the drive assemblies is usually provided by the diesel engine.

A road stabilizer is a type of milling machine that does not include a conveyor system which is designed to carry the milled material that has been cut from the roadway by the rotating milling drum away from the machine. Instead, the milling drum of a road stabilizer is generally employed to mill or pulverized an existing road bed or roadway to a greater depth than does a milling machine prior to repaving (usually called reclaiming) or prior to initial paving (usually called stabilizing), and it leaves the pulverized material in place. The pulverized material left behind is usually compacted and covered with one or more additional layers of crushed aggregate material before paving.

Cold in-place recycling ("CIR") machines can be used to repair damage to a roadway in a single pass, while reusing essentially all of the existing asphalt paving material. In the CIR process, damaged layers of asphalt pavement are removed. The removed material is processed and replaced on the roadway and then compacted. If a roadway has good structural strength, CIR can be an effective treatment for all types of cracking, ruts and holes in asphalt pavement. CIR can be used to repair asphalt roadways damaged by fatigue (alligator) cracking, bleeding (of excess asphalt cement), block cracking, corrugation and shoving, joint reflective cracking, longitudinal cracking, patching, polished aggregate, potholes, raveling, rutting, slippage cracking, stripping and transverse (thermal) cracking. CIR can almost always be used when there is no damage to the base of the roadway. Generally, CIR is only half as expensive as a new pavement overlay while providing approximately 80% of the strength of new pavement. CIR can be carried out by a CIR machine comprising a milling machine or a road stabilizer machine that has been modified by mounting an additive spray bar in the milling drum housing to inject an asphalt emulsion or foamed asphalt cement additive into the milling drum housing. The asphalt emulsion or foamed asphalt cement additive is then thoroughly blended with the milled material by the milling drum and can be left in a windrow or fed by the CIR machine's discharge conveyor directly into an asphalt paving machine. When a CIR process is carried out by a modified milling machine or road stabilizer, the additive material is supplied from a separate additive supply tank truck that is coupled to the modified milling machine or road stabilizer machine. The additive material is drawn directly from the tank on the additive supply truck and metered through an additive flow system that is mounted on the milling machine to the spray bar in the milling drum housing.

Because the milling drums and ground-engaging drive assemblies of a milling machine and a road stabilizer (including those modified to perform a CIR process) operate in the same way for purposes of this invention, the term "milling machine" will be used hereinafter as a generic term that describes all of these machines.

During the operation of a milling machine, the lifting columns are employed to set the depth of the cut of the milling drum, and the machine operator advances the milling machine at a rate that permits the milling drum to make the desired cut in the roadway. However, circumstances may arise in which the milling drum encounters increased density material in the roadway during a milling operation, causing the machine to rise up out of the cut. In such circumstances, a milling machine having an automatic grade control system will attempt to compensate for the rise in the milling drum by lowering the frame on the lifting columns. This will cause an undesirable portion of the weight of the milling machine to be supported by the milling drum instead of the lifting columns, and may result in a loss of steering or braking control because of insufficient contact between the drive assemblies on the lifting columns and the roadway. This occurrence is dangerous for the machine operator and may also lead to damage of the milling machine. For example, if the reaction forces exerted by the roadway surface on the milling drum exceed the opposing forces applied to the milling drum by the lifting columns, the machine may lurch backward or forward depending on the direction of rotation of the milling drum. If the milling machine is operating in a down cut mode (i.e., with the milling drum rotating so as to cut downwardly in the direction of travel of the machine), the machine may lurch forward, whereas if the machine is operating in an up cut mode (i.e., with the milling drum rotating so as to cut upwardly in the direction of travel of the machine), the machine may lurch backwards. The terms "kick-back", "kick-back event", and similar terms will be used hereinafter to describe the lurching, either forward or backward, that occurs or may occur when the milling drum encounters conditions that cause an undesirable portion of the weight of the milling machine to be supported by the milling drum instead of the lifting columns.

Furthermore, as mentioned above, if circumstances arise in which an undesirable portion of the weight of the milling machine to be supported by the milling drum instead of the lifting columns, the milling machine may experience a loss of steering or braking control because of insufficient contact between the ground-engaging drive assemblies on the lifting columns and the roadway.

U.S. Pat. No. 5,318,378 describes a milling machine having a kick-back control system. In one embodiment, the kick-back control system includes a pressure sensor that is in fluid communication with the pressure chamber of one of the lifting columns. In this embodiment, the pressure sensor will communicate with a controller that can direct pressurized hydraulic fluid to the upper or lower pressure chamber of the lifting column to raise or lower the frame of the machine to maintain a desired elevation of the milling drum. However, the inventors have observed that such a system cannot anticipate a kick-back event, and furthermore, that it is subject to providing false signals to the controller due to adjustments that may be made by the grade control system. In a second embodiment, the kick-back control system includes a load cell or strain gauge that is attached to the inner leg tube of a lifting column. This load cell or strain gauge is adapted to sense the compressive force, transmitted through the inner leg tube, which is imparted to the frame of the milling machine by the kick-back event. The load cell or strain gauge is operatively connected to a controller that may be activated to raise the frame on the affected lifting column and/or to stop the rotation of the milling drum. However, a disadvantage of this embodiment of the kick-back control system, like that of the first embodiment, is that it can only react after a kick-back event has occurred. Another disadvantage of this kick-back control system is that location of the load cell or strain gauge on the inner leg tube of a lifting column places the load cell or strain gauge on a component (i.e., the inner leg tube) that moves with respect to the frame during normal operation of the milling machine. This subjects the load cell or strain gauge to bending moments caused by the imposition of directional forces due to normal forward motion or steering of the drive assembly. These bending moments could affect the ability of the load cell or strain gauge to accurately sense the compressive forces caused by a kick-back event and could lead to a failure to react to a kick-back event, or to a kick-back reaction when no kick-back event has occurred.

U.S. Pat. No. 5,879,056 describes a milling machine having a separate wheel assembly that is adapted to rotate in a forward direction when the machine travels in a forward direction and in a backward direction when the machine travels in the opposite direction. The assembly also includes an electronic sensor that detects when the wheel travels in the backward direction and signals a controller to disable the milling drum when the wheel travels in the backward direction by a predetermined distance.

U.S. Pat. Nos. 8,128,177, 8,292,371 and 8,632,132 describe milling machines that include strain gauges that are mounted on opposite side walls of the milling drum housing and are adapted to measure the reaction force of the roadway surface on the milling drum that is transmitted through the drum housing. These strain gauges transmit signals to a controller when the reaction force has exceeded a predetermined level, and the controller then reduces the power to the machine drive assemblies and/or reduces the rate at which the milling drum is lowered into contact with the roadway surface.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "coupled", "connected" and "interconnected", refer to a relationship wherein structures are secured or attached to one another either directly or indirectly through intervening structures, as well as both moveable and rigid attachments or relationships, unless specified herein or clearly indicated by context. The terms "operatively connected" and "operatively attached" describe such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiment thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

The term "milling machine" refers to a vehicle having a milling drum that is adapted to be rotated so as to cut into the surface on which the vehicle is operated, and includes machines that may be called milling machines, cold planers, road stabilizers or reclaiming machines.

The term "milling direction" refers to the primary direction of travel of a milling machine as it operates on a roadway.

The terms "front", "forward" and similar terms, when used with respect to a milling machine or a component of such a machine, refer to a relative location or direction towards the leading end of the milling machine as it travels in the milling direction.

The terms "rear", "behind" and similar terms, when used with respect to a milling machine or a component of such a machine, refer to a relative location or direction towards the trailing end of the milling machine as it travels in the milling direction.

The terms "upper", "top", "above" and similar terms, when used in reference to a relative position or direction on or with respect to a milling machine, or a component or portion of such a machine, refer to a relative position or direction that is farther away from the surface on which the milling machine is placed for operation.

The terms "lower", "bottom", "below" and similar terms, when used in reference to a relative position or direction on or with respect to a milling machine, or a component or portion of such a machine, refer to a relative position or direction that is nearer to the surface on which the milling machine is placed for operation.

The term "load cell sensor" refers to a transducer or sensor that is used to generate an electrical signal having a magnitude that is directly proportional to a force being measured. A strain gauge load cell sensor generates a signal that corresponds to the deformation or strain perceived by the load cell sensor, as a change in electrical resistance, which is a measure of the applied force.

The term "linear actuator" refers to an electric, pneumatic, hydraulic, electro-hydraulic or mechanical device that generates force which is directed in a straight line. One common example of a "linear actuator" is a hydraulic actuator which includes a cylinder, a piston within the cylinder, and a rod attached to the piston. By increasing the pressure within the cylinder on one side of the piston (over that on the opposite side of the piston), the rod will extend from the cylinder or retract into the cylinder.

SUMMARY OF THE INVENTION

The invention comprises a milling machine having a frame to which a milling drum is mounted, and a primary drum drive assembly for driving the milling drum. The milling machine also includes a ground-engaging drive assembly for driving the milling machine along a roadway and a drive control system for the ground-engaging drive assembly. A lifting column is attached between the frame of the milling machine and the ground-engaging drive assembly. The lifting column includes a linear actuator which can raise and lower the frame of the machine with respect to the roadway. A load cell sensor mounted to the lifting column is adapted to determine if the lifting column is not supporting at least a predetermined portion of the weight of the milling machine. The load cell sensor is attached to a top bracket of the lifting column in such a manner that it does not rotate or otherwise move with respect to the frame of the milling machine as the lifting column or the ground-engaging drive assembly is operated. Preferably, the load cell sensor is a pin-type load cell that is used to attach the upper end of the linear actuator to the outer leg tube of the lifting column. A controller is operatively attached to the primary drum drive assembly, to the drive control system for the ground-engaging drive assembly, and to the load cell sensor, and the controller is adapted to receive from the load cell sensor a signal indicating that the lifting column is not supporting the predetermined portion of the weight of the milling machine. Upon receipt of such signal, the controller will automatically initiate control of certain machine functions in order to prevent a kick-back event or a loss of control of the milling machine.

In order to facilitate an understanding of the invention, the preferred embodiments of the invention, as well as the best mode known by the inventors for carrying out the invention, is illustrated in the drawings, and a detailed description thereof follows. It is not intended, however, that the invention be limited to the particular embodiments described or to use in connection with the apparatus illustrated herein. Therefore, the scope of the invention contemplated by the inventors includes all equivalents of the subject matter described herein, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and wherein.

DESCRIPTION OF THE PREFERRED EMBODIMENTS OF THE INVENTION

Figure 1:
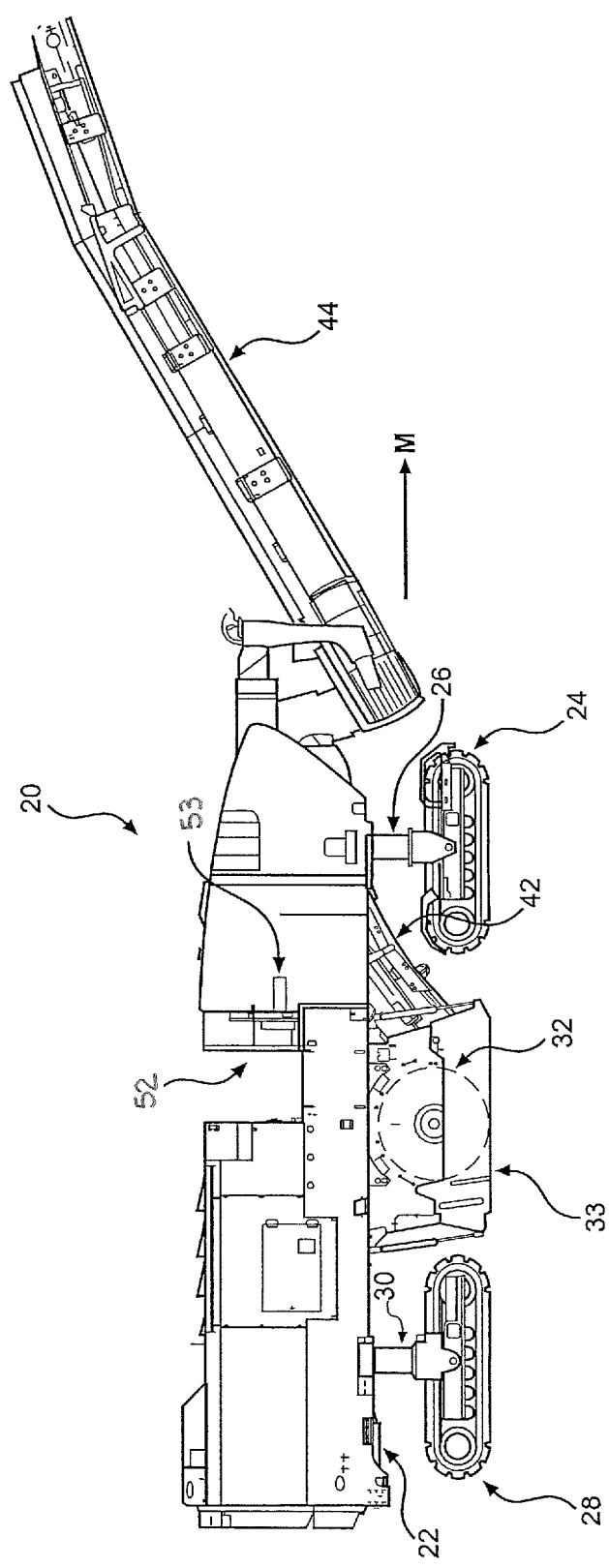
FIG. 1 is a side view of a milling machine which includes the invention.

This description of the preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

Figure 2:
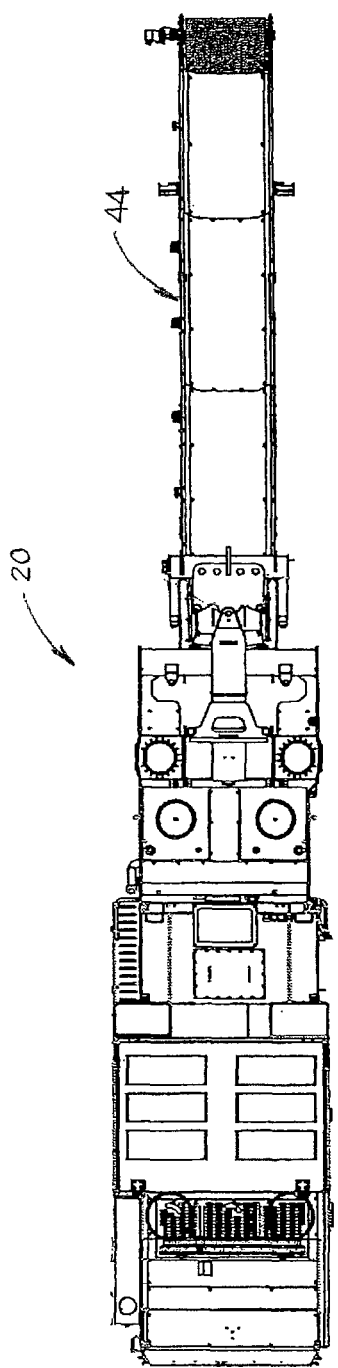
FIG. 2 is a top view of the milling machine shown in FIG. 1.

As shown in FIGS. 1 and 2, a milling machine that is equipped with a preferred embodiment of the invention is indicated generally at 20. This machine comprises a mobile vehicle having a frame 22 and a plurality of ground-engaging drive assemblies that are attached to lifting columns, including right front track drive assembly 24 which is attached to lifting column 26, a left front track drive assembly (not shown but substantially similar to right front track drive assembly 24), right rear track drive assembly 28 which is attached to right rear lifting column 30, and a left rear track drive assembly (not shown but substantially similar to right rear track drive assembly 28). As is known to those having ordinary skill in the art, the milling machine may include only a single center-mounted rear ground-engaging track drive assembly, or it may include four wheel-driven ground-engaging drive assemblies instead of track-driven ground-engaging assemblies. Preferably, at least the front ground-engaging drive assemblies are steerable to provide precise directional control. Each of the ground-engaging drive assemblies is operatively attached to or comprises a drive control system and is adapted to provide a driving force to drive the milling machine along the roadway surface.

Figure 3:
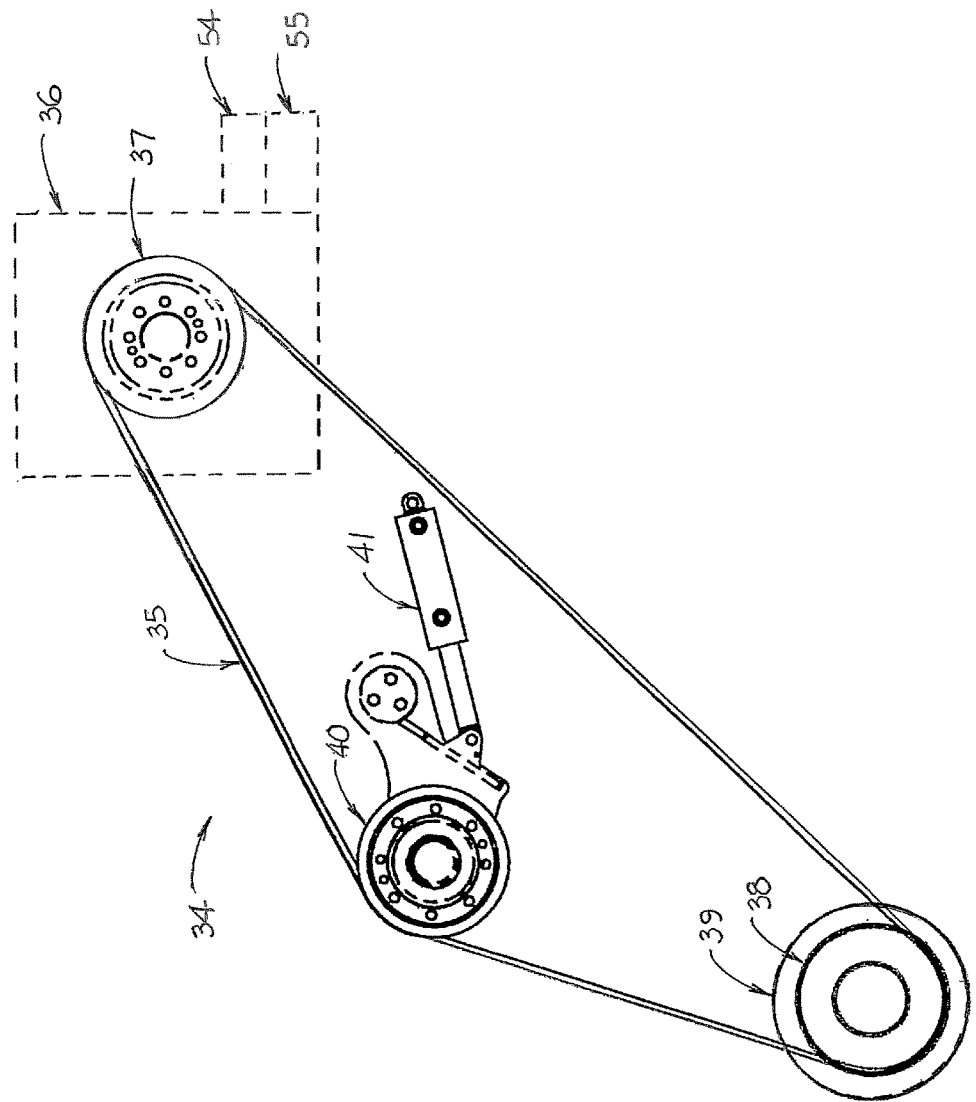
FIG. 3 is a front view of certain components of the primary drum drive assembly for the milling drum of the milling machine illustrated in FIGS. 1 and 2.

Milling machine 20 also includes a milling assembly comprising a generally cylindrical milling drum 32 having a plurality of cutting teeth (not shown) mounted around its periphery. The milling drum is rotated about a substantially-horizontal axis of rotation within drum housing 33 on frame 22 by primary drum drive assembly 34. This primary drum drive assembly includes drive belt 35 that is operatively attached to and is driven by an engine drive shaft of diesel engine 36, as shown schematically in FIG. 3, on which engine drive sheave 37 is mounted. Drive belt 35 is also operatively attached to drum sheave 38 on an input drive shaft for milling drum 32. In other embodiments of the invention (not shown), the primary drum drive assembly comprises one or more hydraulic motors (not shown) and a drive belt that engages a sheave on an input shaft for the milling drum. Gear box 39 is located between drum sheave 38 and the milling drum (not shown in FIG. 3) in both the primary drum drive assembly comprising a direct engine drive shown in the drawings, and in a primary drum drive assembly that includes one or more hydraulic motors. Gear box 39 includes a gear train and an output drive shaft on which the milling drum is rotated. The gear box thus allows for rotation of the output drive shaft for the milling drum at a speed and torque that is different from that of the input drive shaft. Primary drum drive assembly 34 also includes a belt tensioning assembly including tensioning sheave 40, which is pivotally mounted within the primary drum drive assembly, and tensioning actuator 41 that is operatively attached to the tensioning sheave. Tensioning actuator 41 is a linear actuator that may be employed to move tensioning sheave 40 in order to increase or decrease the tension of drive belt 35. Milling drum 32 is adapted for cutting a width of material from the surface in the path of the machine as milling machine 20 travels in milling direction "M" (shown in FIG. 1), and for depositing the milled material on first conveyor 42, which carries it to second conveyor 44 for discharge into a truck.

Figure 4:
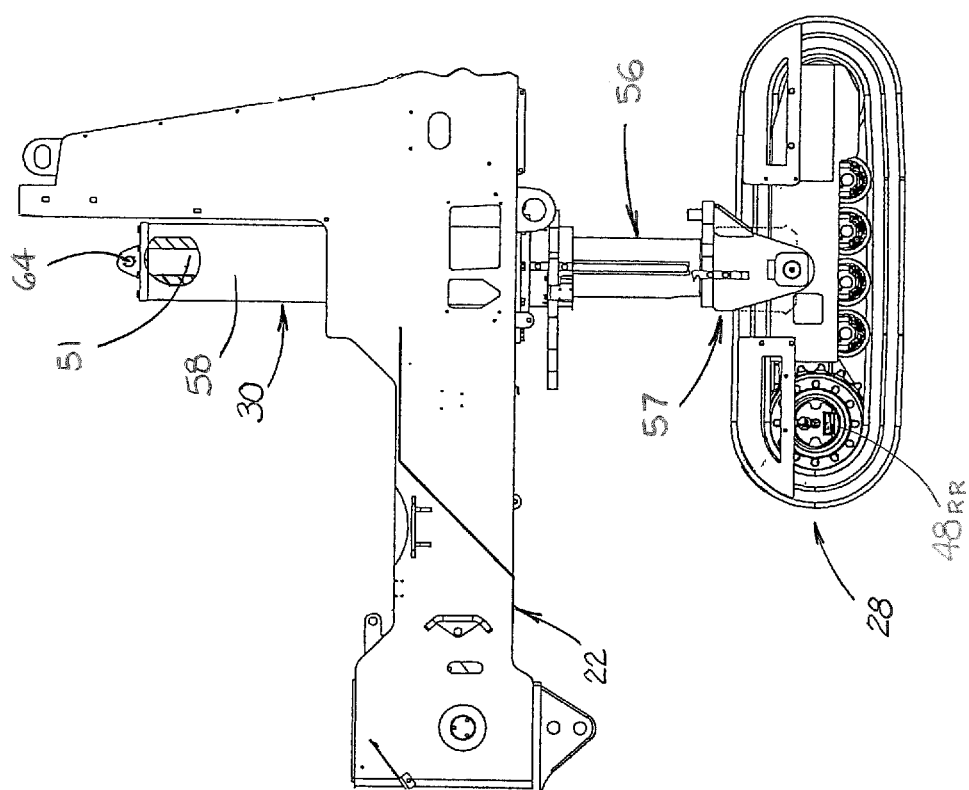
FIG. 4 is an enlarged view of the right rear lifting column and ground-engaging drive assembly of the milling machine shown in FIGS. 1 and 2, with a side panel removed to illustrate certain components of the lifting column.
Figure 5:
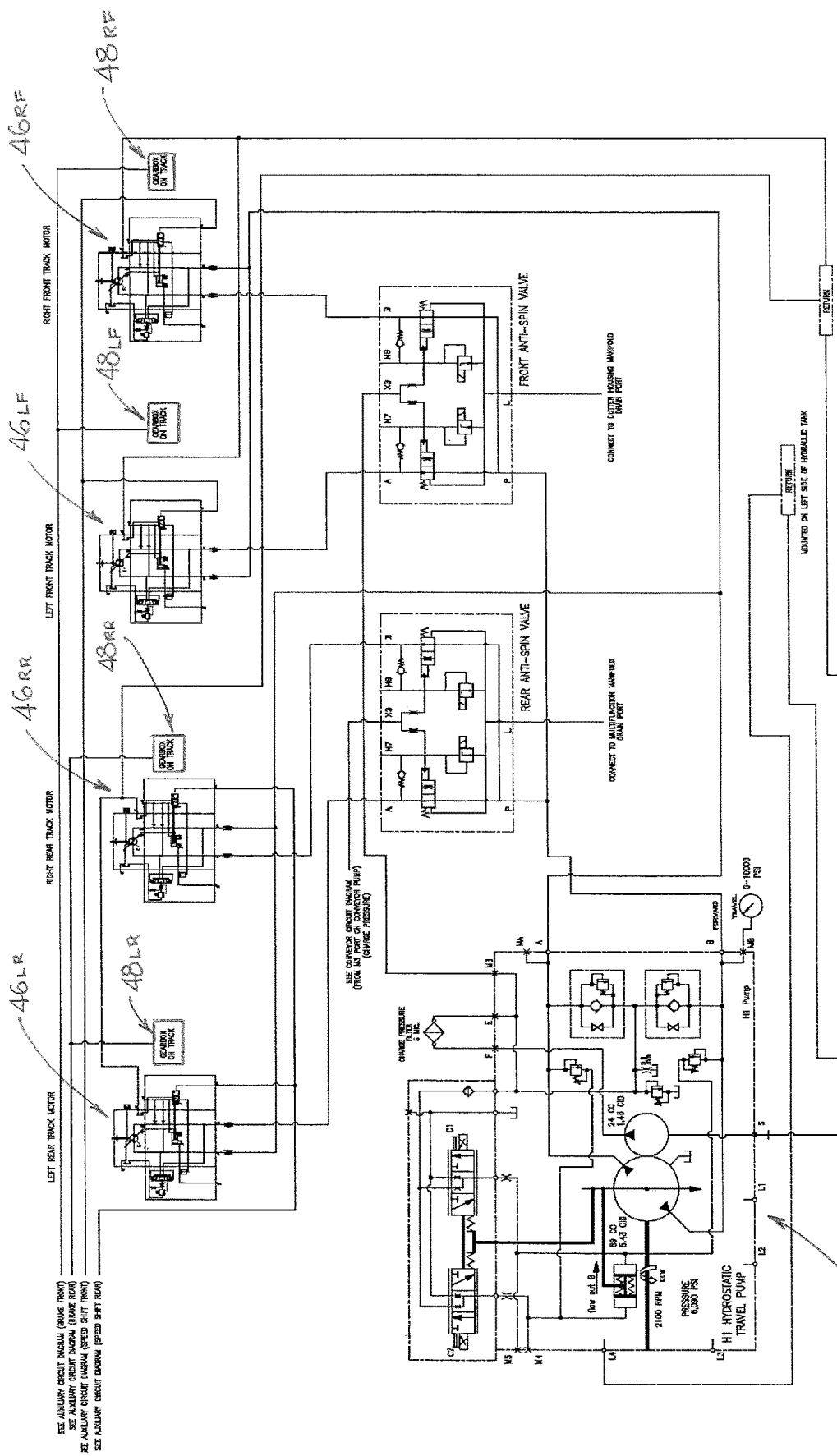
FIG. 5 is a schematic view of certain components of the drive control system for the ground engaging drive assemblies of the milling machine shown in FIG. 1.

The drive control system for each ground-engaging drive assembly preferably comprises a hydraulic motor, such as right rear hydraulic motor $46_{RR}$ (shown in FIG. 5) that is operatively attached to right rear gearbox $48_{RR}$ with an integrated friction brake (shown in FIGS. 4 and 5). Similarly, left rear hydraulic motor $46_{LR}$ (shown in FIG. 5) is operatively attached to left rear gearbox $48_{LR}$ with an integrated friction brake, right front hydraulic motor $46_{RF}$ is operatively attached to right front gearbox $48_{RF}$ with an integrated friction brake, and left front hydraulic motor $46_{LF}$ is operatively attached to left front gearbox $48_{LF}$ with an integrated friction brake. In this preferred embodiment of the invention, the hydraulic motors for the ground-engaging drive assemblies are part of a hydraulic circuit that includes a hydraulic fluid pump 50 and associated control valves known to those having ordinary skill in the art to which the invention relates. Hydraulic fluid pump 50 is driven by diesel engine 36, which is also part of the drive control system for the ground-engaging drive assemblies. The drive control system may operate the engine, the hydraulic fluid pump and/or the control valves to increase or decrease the flow of hydraulic fluid to one or more of the hydraulic motors to increase or reduce the driving force provided by the associated ground-engaging drive assembly or assemblies. The drive control system may also apply the integrated friction brake on one or more ground-engaging drive assemblies to decrease the driving force provided by the ground-engaging drive assembly or assemblies.

Figure 6:
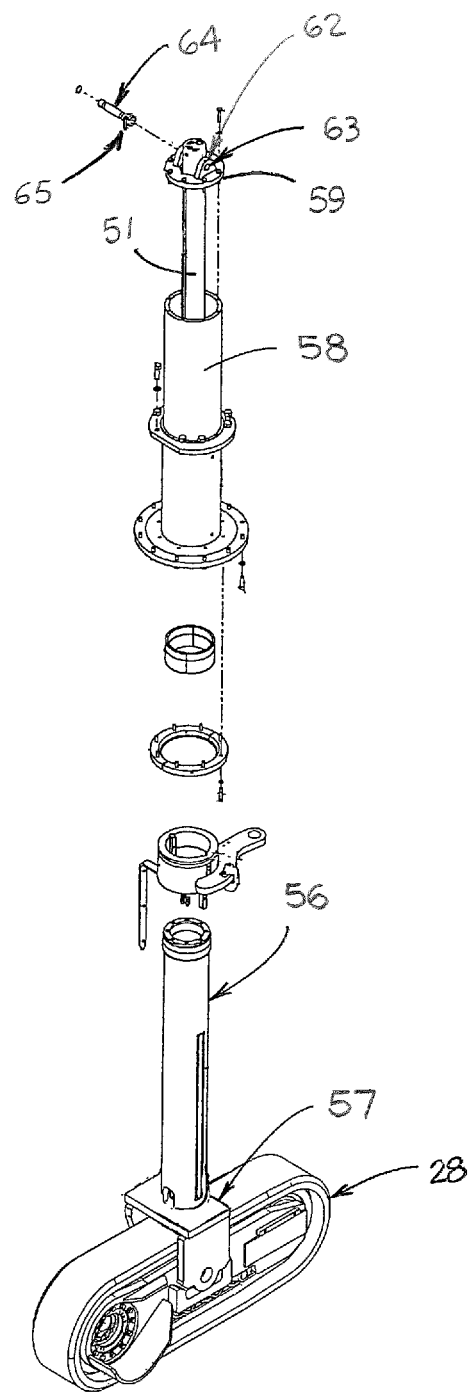
FIG. 6 is an exploded view of the right rear lifting column shown in FIG. 4.
Figure 9:
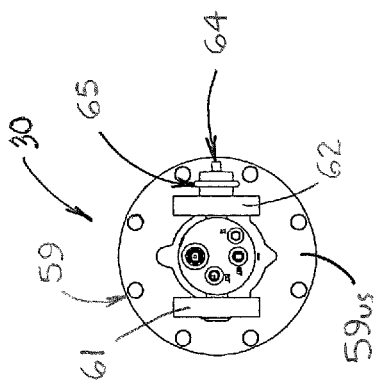
FIG. 9 is a top view of the portion of the lifting column shown in FIG. 7.
Figure 8:
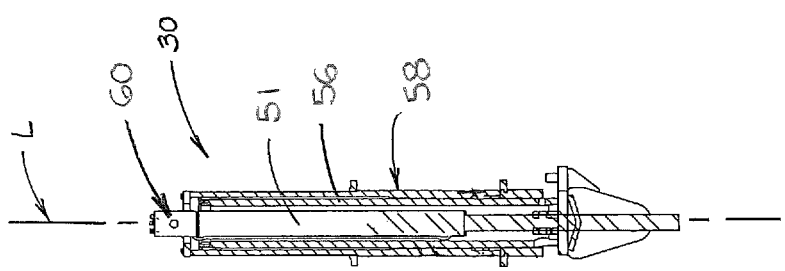
FIG. 8 is a sectional view through the portion of the lifting column shown in FIG. 7, taken along the line 8-8 of FIG. 7.
Figure 7:
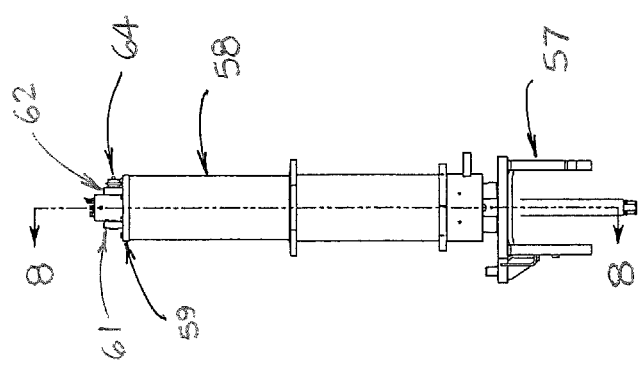
FIG. 7 is a side view of a portion of the lifting column shown in FIGS. 4 and 6.

A linear actuator, such as linear actuator 51 shown in FIGS. 4, 6 and 8, is mounted within each of the lifting columns of the ground-engaging drive assemblies and is adapted to move the frame of the milling machine vertically with respect to the ground-engaging drive assemblies. Thus, the linear actuators within the lifting columns are adapted to raise the frame of the milling machine and the milling drum with respect to the roadway surface, or to lower the frame and the milling drum with respect to the roadway surface.

Milling machine 20 is operated by an operator in operator's station 52 which includes controller 53. Controller 53 may embody a single microprocessor or multiple microprocessors that include components for controlling the invention, including primary drum drive assembly 34 for rotation of milling drum 32, and the drive control system for the ground-engaging drive assemblies, as well as other operations of milling machine 20 based on input from an operator of the milling machine and on sensed or other known operational parameters. Thus, for example, controller 53 is operatively connected to a throttle assembly 54 (shown schematically in FIG. 3) for diesel engine 36 and to a hydraulic clutch assembly 55 (also shown schematically in FIG. 3) for engine 36, and is adapted to control the speed and operation of the diesel engine. Controller 53 is also operatively connected to hydraulic motors $46_{RR}$, $46_{LR}$, $46_{RF}$, $46_{LF}$, and the associated gear boxes and friction brakes, hydraulic fluid pump 50, and to the valves for controlling the flow of hydraulic fluid in the hydraulic circuit to the various components within the circuit, such as linear actuators 51 in the lifting columns, the actuators that control the movement of certain components of machine 20 including conveyors 42 and 44, and the other hydraulic motors in the hydraulic circuit.

Controller 53 is preferably programmed with information about the various relative positions, configurations and dimensions of the milling drum with respect to the frame, and the lifting columns supporting the ground-engaging drive assemblies, including the linear actuators contained within the lifting columns, so that controller 53 can determine the specific adjustments in the elevations of the lifting columns that are required to maintain a desired cut depth. Controller 53 includes or is associated with a memory, and it will preferably include a data input component such as a touch screen, a keyboard and/or a plurality of actuating buttons for receiving input from an operator of the milling machine. Controller 53 may also include a data output component such as a display screen, a secondary storage device, a processor and other components for running an application. Various circuits may be associated with and operatively connected to the controller, such as power supply circuitry and hydraulic circuitry. Numerous commercially available microprocessors can be configured to perform the functions of controller 53. It should be appreciated that the controller could readily be embodied in a general purpose computer or machine microprocessor capable of controlling numerous milling machine functions.

FIGS. 4-14 illustrate a preferred embodiments of certain components of an assembly for automatically stopping the rotation of milling drum 32 if the controller determines that right rear lifting column 30 is not supporting a predetermined portion of the weight of the milling machine that is indicative of a kick-back event, or if the controller determines that one or more of the ground-engaging assemblies is not supporting a predetermined portion of the weight of the milling machine that would be sufficient to produce a driving force of sufficient magnitude to prevent slippage of the track on the roadway surface. Thus, as shown therein, right rear lifting column 30 comprises inner leg tube 56 having a bracket 57 on its lower end to which ground-engaging track drive assembly 28 is attached. The upper end of outer leg tube 58 is fixed to frame 22 of milling machine 20, and inner leg tube 56 is disposed within the outer leg tube. Linear actuator 51 is disposed within the inner leg tube, as best shown in FIGS. 6 and 8, and is attached at its upper end to the outer leg tube and at its lower end to the inner leg tube, so that operation of linear actuator 51 will cause the outer leg tube to move axially with respect to the inner leg tube, thereby moving frame 22 with respect to ground-engaging track drive assembly 28. The upper end of linear actuator 51 extends through top bracket 59 of outer leg tube 58 and includes a hole 60 (shown in FIG. 8) which is aligned with holes in pin supports 61 and 62 (only one of which, hole 63 in pin support 62 is shown in FIG. 6) of top bracket 59. Load cell sensor 64 is preferably a pin-type load cell that is placed through the holes in pin supports 61 and 62 of top bracket 59 and through hole 60 in the upper end of the linear actuator in order to attach linear actuator 51 to outer leg tube 58. By locating load cell sensor 64 in top bracket 59 on top of the ground-engaging lifting column, the load cell sensor will not move with respect to the frame of the machine as the lifting column or the associated track drive assembly is operated. Consequently, the load cell sensor will only detect vertically directed forces and will not be subject to bending moments caused by the imposition of directional forces due to normal forward motion or steering of the drive assembly.

In this respect, the invention represents an improvement over the system of U.S. Pat. No. 5,318,378.

Figure 10:
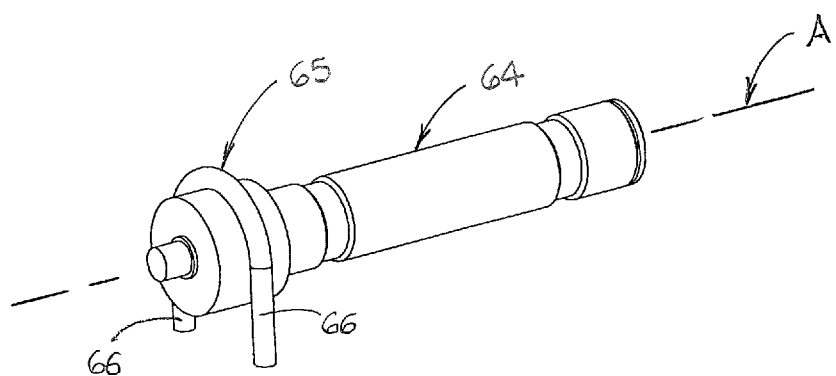
FIG. 10 is a perspective view of a preferred embodiment of a load cell sensor that is a part of the invention, showing a first embodiment of a sensor mounting bracket that is adapted to be attached to the upper surface of the top bracket of the outer leg tube of a lifting column.
Figure 11:
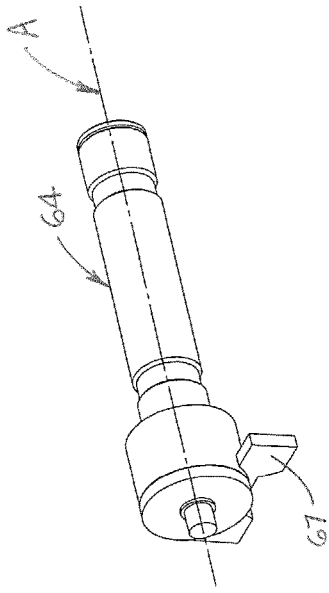
FIG. 11 is a perspective view of a portion of a preferred embodiment of a load cell sensor that is part of the invention, showing a second embodiment of a sensor mounting bracket that is adapted to facilitate the attachment by the load cell sensor of the upper end of the linear actuator to the outer leg tube of a lifting column.
Figure 12:
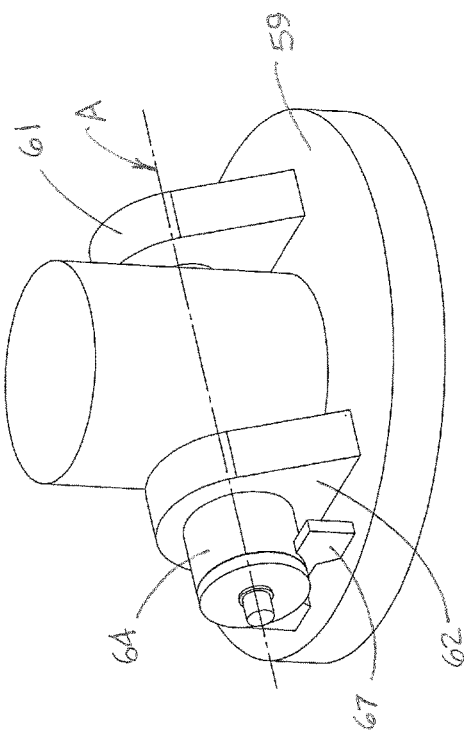
FIG. 12 is a perspective view of a preferred embodiment of a load cell sensor that is a part of the invention, showing the second embodiment of the sensor mounting bracket that is adapted to be attached to the upper surface of the top bracket of the outer leg tube of a lifting column.
Figure 13:
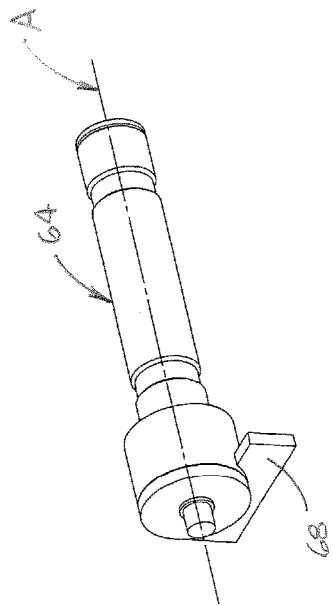
FIG. 13 is a perspective view of a portion of a preferred embodiment of a load cell sensor that is part of the invention, showing a third embodiment of a sensor mounting bracket that is adapted to facilitate the attachment by the load cell sensor of the upper end of the linear actuator to the outer leg tube of a lifting column.
Figure 14:
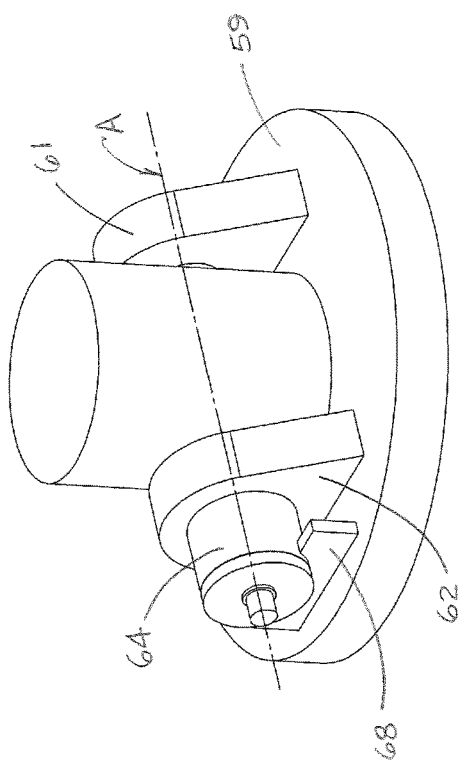
FIG. 14 is a perspective view of a preferred embodiment of a load cell sensor that is a part of the invention, showing the third embodiment of the sensor mounting bracket that is adapted to be attached to the upper surface of the top bracket of the outer leg tube of a lifting column.

As shown in FIGS. 4, 6, 7, 9, and 10-14, load cell sensor 64 is preferably substantially cylindrical and has an axis "A" (shown in FIGS. 10-14) that is oriented substantially perpendicular to long axis "L" of lifting column 30 (shown in FIG. 8), i.e., the axis along which outer leg tube 58 (and frame 22) moves with respect to inner leg tube 56. Load cell sensor 64 is attached to and spaced from the upper surface $59_{US}$ of top bracket 59 of outer leg tube 58 by means of a sensor mounting bracket. In the embodiment of the invention shown in FIGS. 6, 9 and 10, sensor mounting bracket 65 comprises a U-shaped bracket. One end of load cell sensor 64 is integrally attached to the bend of U-shaped sensor mounting bracket 65, as best shown in FIG. 10, and the legs 66 of U-shaped sensor mounting bracket 65 serve to space the attached end of load cell sensor 64 away from upper surface $59_{US}$ of top bracket 59. Thus, U-shaped sensor mounting bracket 65 is adapted to position the load cell sensor out of contact with the top bracket 59 by a predetermined clearance and to prevent rotation of the load cell sensor. Similarly, in the embodiments of the invention illustrated in FIGS. 11-14, one end of load cell sensor 64 is mounted atop sensor mounting bracket 67 or sensor mounting bracket 68 to space the attached end of load cell sensor 64 away from the upper surface $59_{US}$ of top bracket 59. These alternative sensor mounting brackets are adapted to position the load cell sensor out of contact with the top bracket 59 by a predetermined clearance and to prevent rotation of the load cell sensor.

With any of the disclosed embodiments of the sensor mounting bracket, load cell sensor 64, as placed through the upper end of linear actuator 51 and mounted on top bracket 59, is positioned to measure the load or strain on rear lifting column 30. Because of this mounting configuration, load cell sensor 64 is mounted to lifting column 30 in such a manner that it detects only forces that are directed along long axis "L" of the lifting column. Load cell sensor 64 is operatively attached to controller 53 and is adapted to send signals indicative of the load or strain on the lifting column to the controller. Controller 53 is also operatively attached to the drive control system for each ground-engaging drive assembly, and is adapted to control the operation of the drive control systems for the ground-engaging drive assemblies, including by slowing or stopping the driving force provided by each ground-engaging drive assembly. Controller 53 is also operatively attached to the primary drum drive assembly, and is adapted to control the primary drum drive assembly, including by stopping the rotation of the milling drum.

During normal operation of the milling machine, the linear actuators within the lifting columns control the axial positions of the outer leg tubes with respect to the inner leg tubes in order to properly locate the milling drum with respect to the roadway surface. Thus, for example, linear actuator 51 within right rear lifting column 30 controls the axial position of outer leg tube 58 with respect to inner leg tube 56. The weight of milling machine 20 is supported primarily by the components of the vertical lifting columns including right rear lifting column 30. By virtue of the mounting of load cell sensor 64 with respect to linear actuator 51 as shown in the drawings, the axial deformation of load cell sensor 64, i.e. deformation along axis "A" shown in FIGS. 10-14, is a function of the portion of the weight of the milling machine that is supported by lifting column 30. Thus, load cell sensor 64 is adapted to transmit to controller 53 a continuous voltage signal that varies as the sensed axial deformation changes. If the signal from the load cell sensor falls below a predetermined value, controller 53 will interpret this signal as indicating a decrease in the load on lifting column 30 to which the load cell sensor is attached, and thus a decrease in the portion of the weight of milling machine 20 that is supported by the lifting column. When controller 53 determines that lifting column 30 is not supporting at least a predetermined portion of the weight of the milling machine that is anticipatory of a kick-back event, such as, for example, about 1200 pounds, controller 53 will stop the operation of the primary drum drive assembly to rotate milling drum 32, by disengaging the hydraulic clutch assembly 55, or by other means in anticipation of, and in order to prevent, a kick-back event.

Although it is preferable that a load cell sensor be mounted to at least one rear lifting column in order to anticipate a kick-back event, load cell sensors may be mounted to all of the lifting columns, in order to anticipate when the drive assembly to which the lifting column is attached may lose traction. In such event, the predetermined portion of the weight of the milling machine that, if not supported, would indicate a loss of traction would depend on how much torque is applied to the track-drive assembly, the travel speed of the milling machine, the track contact area on the roadway surface, and other factors. In such circumstances, the controller may be provided with two different predetermined portions of the weight of the milling machine, the first of which, if not supported, would be indicative of a kick-back event, and the second of which, if not supported, would be indicative of a loss of traction. If so, the controller would be adapted, when the signal received from the sensor indicates that the lifting column is not supporting at least the first predetermined portion of the weight of the milling machine, to cause the primary drum drive assembly to stop the rotation of the milling drum, and it would also be adapted, when the signal received from the sensor indicates that the lifting column is not supporting at least the second predetermined portion of the weight of the milling machine, to cause the drive control system to slow or stop the driving force provided by the ground-engaging drive assembly.

The invention employs a load cell sensor such as sensor 64 that is mounted to a lifting column such as rear lifting column 30. The load cell sensor is adapted to measure a load or strain on the lifting column, and to transmit to the controller a signal indicative of the load or strain measured by the load cell sensor. In this embodiment of the invention, the controller is adapted to receive the signal indicative of the load or strain measured by the load cell sensor from the load cell sensor, and to stop the rotation of the milling drum when the signal received from the load cell sensor indicates that the lifting column is no longer supporting at least the predetermined portion of the weight of the milling machine that is indicative of the imminence of a kick-back event. In addition or in the alternative, the controller is adapted to cause the drive control system to slow or stop the driving force provided by a ground-engaging drive assembly when the signal received from the sensor mounted to the lifting column indicates that the lifting column is not supporting at least the predetermined portion of the weight of the milling machine.

The invention thus provides a simple system for automatically stopping the rotation of the milling drum, and/or for slowing or stopping the driving force provided by a ground-engaging drive assembly, if the system determines that the milling drum is not being sufficiently supported by a lifting column, thereby preventing a lurch backwards or a lurch forwards of the milling machine, depending on the direction of rotation of the milling drum, and/or a loss of control of the milling machine.

Although this description contains many specifics, these should not be construed as limiting the scope of the invention but as merely providing an illustration of the presently preferred embodiments thereof, as well as the best mode contemplated by the inventors of carrying out the invention. The invention, as described herein, is susceptible to various modifications and adaptations as would be appreciated by those having ordinary skill in the art to which the invention relates.

What is claimed is:

1. A milling machine for milling a roadway surface, said milling machine having a milling machine weight and further comprising:
   (a) a frame;
   (b) a milling assembly comprising:
      (i) a drum housing that is attached to the frame;
      (ii) a milling drum that is mounted within the drum housing and adapted for rotation about a substantially horizontal axis;
   (c) a ground-engaging drive assembly that is operatively attached to a drive control system and is adapted to provide a driving force to drive the milling machine along the roadway surface;
   (d) a lifting column that is attached at its upper end to the frame and at its lower end to the ground-engaging drive assembly, said lifting column including:
      (i) an outer leg tube which is fixed to the frame and which has a top bracket with an upper surface;
      (ii) a linear actuator which can be operated to raise and lower the frame of the machine with respect to the roadway surface;
   (e) a load cell sensor that is:
      (i) attached to the top bracket of the lifting column in such a manner that it does not rotate or otherwise move with respect to the frame as the lifting column or the ground-engaging drive assembly is operated;
      (ii) adapted to determine if the lifting column is not supporting at least a predetermined portion of the weight of the milling machine;
      (iii) adapted to generate a signal indicating that the lifting column is not supporting at least the predetermined portion of the weight of the milling machine;
   (f) a controller that is:
      (i) operatively attached to the drive control system for the ground-engaging drive assembly;
      (ii) adapted to control the operation of the drive control system for the ground-engaging drive assembly;
      (iii) operatively attached to the load cell sensor;
      (iv) adapted to receive the signal indicating that the lifting column is not supporting at least the predetermined portion of the weight of the milling machine;
      (v) adapted to cause the drive control system to reduce or stop the driving force provided by the ground-engaging drive assembly when the signal received from the sensor indicates that the lifting column is not supporting at least the predetermined portion of the weight of the milling machine.

2. The milling machine of claim 1 wherein:
   (a) the drive control system for the ground-engaging drive assembly comprises a hydraulic motor that is a part of a hydraulic circuit which includes a hydraulic fluid pump;
   (b) the controller is adapted to decrease the flow of hydraulic fluid to the hydraulic motor to reduce the driving force provided by the ground-engaging drive assembly when the signal received from the sensor indicates that the lifting column is not supporting at least the predetermined portion of the weight of the milling machine.

3. The milling machine of claim 1 wherein:
   (a) the drive control system for the ground-engaging drive assembly comprises a hydraulic motor which is operatively attached to a gearbox with an integrated friction brake;
   (b) the controller is adapted to apply the friction brake to reduce the driving force provided by the ground-engaging drive assembly when the signal received from the sensor indicates that the lifting column is not supporting at least the predetermined portion of the weight of the milling machine.

4. The milling machine of claim 1 wherein:
   (a) the lifting column includes an inner leg tube having a lower end to which the ground-engaging drive assembly is attached;
   (b) the outer leg tube is adapted for axial movement with respect to the inner leg tube;
   (c) the linear actuator is attached at its upper end to the outer leg tube and at its lower end to the inner leg tube, and is adapted to move the outer leg tube with respect to the inner leg tube.

5. The milling machine of claim 4 wherein:
   (a) the lifting column includes a long axis;
   (b) the load cell sensor is mounted to the lifting column in such a manner that it detects only forces that are directed along the long axis of the lifting column.

6. The milling machine of claim 5 wherein the load cell sensor is substantially cylindrical and has an axis that is oriented substantially perpendicular to the long axis of the lifting column.

7. The milling machine of claim 4 wherein the load cell sensor is a pin-type load cell that attaches the upper end of the linear actuator to the outer leg tube.

8. The milling machine of claim 7 wherein the load cell sensor is spaced away from the upper surface of the top bracket.

9. The milling machine of claim 8 wherein:
   (a) the top bracket of the outer leg tube has a pair of pin supports, each of which includes a hole;
   (b) the upper end of the linear actuator extends through the top bracket of the outer leg tube and includes a hole which is aligned with the holes in the pin supports;
   (c) the pin-type load cell is placed through the holes in the pin supports of the top bracket and through the hole in the upper end of the linear actuator in order to attach the linear actuator to the outer leg tube.

10. A milling machine for milling a roadway surface, said milling machine having a milling machine weight and further comprising:
    (a) a frame;
    (b) a milling assembly comprising:
       (i) a drum housing that is attached to the frame;
       (ii) a milling drum that is mounted within the milling drum housing and adapted for rotation about a substantially horizontal axis;
       (iii) a primary drum drive assembly that is operatively attached to the milling drum and adapted to rotate the milling drum;
    (c) a ground-engaging drive assembly that is operatively attached to a drive control system and is adapted to provide a driving force to drive the milling machine along the roadway surface;

(d) a lifting column that is attached at its upper end to the frame and at its lower end to the ground-engaging drive assembly, said lifting column having a long axis and including:
  (i) a linear actuator which can be operated to raise and lower the frame of the machine with respect to the roadway surface;
  (ii) an outer leg tube which is fixed to the frame and which has a top bracket, said top bracket having an upper surface;

(e) a load cell sensor that is adapted to:
  (i) attach the upper end of the linear actuator to the outer leg tube;
  (ii) determine if the lifting column is not supporting at least a predetermined portion of the weight of the milling machine;
  (iii) generate a signal indicating that the lifting column is not supporting at least the predetermined portion of the weight of the milling machine;

(f) a controller that is:
  (i) operatively attached to the drive control system for the ground-engaging drive assembly;
  (ii) adapted to control the operation of the drive control system for the ground-engaging drive assembly, including by reducing or stopping the driving force provided by the ground-engaging drive assembly;
  (iii) operatively attached to the primary drum drive assembly;
  (iv) adapted to control the primary drum drive assembly, including by stopping the rotation of the milling drum;
  (v) operatively attached to the load cell sensor;
  (vi) adapted to receive the signal indicating that the lifting column is not supporting at least the predetermined portion of the weight of the milling machine;
  (vii) adapted, when the signal received from the sensor indicates that the lifting column is not supporting at least the predetermined portion of the weight of the milling machine:
    (1) to cause the drive control system to reduce the driving force provided by the ground-engaging drive assembly; or
    (2) to cause the drive control system to stop the driving force provided by the ground-engaging drive assembly; or
    (3) to cause the primary drum drive assembly to stop the rotation of the milling drum; or
    (4) to cause the drive control system to reduce the driving force provided by the ground-engaging drive assembly, and to cause the primary drum drive assembly to stop the rotation of the milling drum; or
    (5) to cause the drive control system to stop the driving force provided by the ground-engaging drive assembly, and to cause the primary drum drive assembly to stop the rotation of the milling drum.

11. The milling machine of claim 10:
(a) which includes a sensor mounting bracket that is attached to the upper surface of the top bracket of the outer leg tube;
(b) wherein the load cell sensor is attached to the sensor mounting bracket in such a way that the load cell sensor is spaced away from the upper surface of the top bracket.

12. The milling machine of claim 11 wherein the sensor mounting bracket is adapted to prevent rotation of the load cell sensor.

13. The milling machine of claim 12 wherein the sensor mounting bracket is adapted to position the attached end of the load cell sensor out of contact with the upper surface of the top bracket by a predetermined clearance.

14. The milling machine of claim 10 wherein:
(a) the lifting column includes an inner leg tube having a lower end to which the ground-engaging drive assembly is attached;
(b) the outer leg tube is adapted for axial movement with respect to the inner leg tube;
(c) the linear actuator is attached at its upper end to the outer leg tube and at its lower end to the inner leg tube, and is adapted to move the outer leg tube with respect to the inner leg tube.

15. The milling machine of claim 10 wherein:
(a) the load cell sensor is adapted to:
  (i) measure a load or strain on the lifting column;
  (ii) generate a signal indicative of the load or strain measured by the load cell sensor;
(b) the controller is adapted to receive the signal indicative of the load or strain measured by the load cell sensor from the load cell sensor, said signal being indicative of whether or not the lifting column is supporting at least the predetermined portion of the weight of the milling machine.

16. The milling machine of claim 15 wherein:
(a) the load or strain measured by the load cell sensor comprises an axial deformation that is a function of the weight of the milling machine supported by the lifting column;
(b) the load cell sensor is adapted to transmit to the controller a continuous voltage signal that varies as the sensed axial deformation changes;
(c) the controller is adapted to interpret the continuous voltage signal as indicating a decrease in the weight of the milling machine supported by the lifting column to the predetermined portion if the signal from the load cell sensor falls below a predetermined voltage value.

17. A milling machine for milling a roadway surface, said milling machine having a milling machine weight and further comprising:
(a) a frame;
(b) a milling assembly comprising:
  (i) a drum housing that is attached to the frame;
  (ii) a milling drum that is mounted within the milling drum housing and adapted for rotation about a substantially horizontal axis;
  (iii) a primary drum drive assembly that is operatively attached to the milling drum and adapted to rotate the milling drum;
(c) a ground-engaging drive assembly that is operatively attached to a drive control system and is adapted to provide a driving force to drive the milling machine along the roadway surface;
(d) a lifting column that is attached at its upper end to the frame and at its lower end to the ground-engaging drive assembly, said lifting column having a long axis and including:

(i) a linear actuator which can be operated to raise and lower the frame of the machine with respect to the roadway surface;
(ii) an outer leg tube which is fixed to the frame and which has a top bracket, said top bracket having an upper surface;
(e) a load cell sensor that is adapted to:
(i) attach the upper end of the linear actuator to the outer leg tube;
(ii) determine if the lifting column is not supporting at least a first predetermined portion of the weight of the milling machine;
(iii) generate a signal indicating that the lifting column is not supporting at least the first predetermined portion of the weight of the milling machine;
(iv) determine if the lifting column is not supporting at least a second predetermined portion of the weight of the milling machine, wherein the second predetermined portion of the weight of the milling machine is different from the first predetermined portion of the weight of the milling machine;
(v) generate a signal indicating that the lifting column is not supporting at least the second predetermined portion of the weight of the milling machine;
(f) a controller that is:
(i) operatively attached to the drive control system for the ground-engaging drive assembly;
(ii) adapted to control the operation of the drive control system for the ground-engaging drive assembly, including by reducing or stopping the driving force provided by the ground-engaging drive assembly;
(iii) operatively attached to the primary drum drive assembly;
(iv) adapted to control the primary drum drive assembly, including by stopping the rotation of the milling drum;
(v) operatively attached to the load cell sensor;
(vi) adapted to receive the signal indicating that the lifting column is not supporting at least the predetermined portion of the weight of the milling machine;
(vii) adapted, when the signal received from the sensor indicates that the lifting column is not supporting at least the first predetermined portion of the weight of the milling machine, to cause the drive control system to reduce or stop the driving force provided by the ground-engaging drive assembly; and
(viii) adapted, when the signal received from the sensor indicates that the lifting column is not supporting at least the second predetermined portion of the weight of the milling machine, to cause the primary drum drive assembly to stop the rotation of the milling drum.

18. The milling machine of claim 17 wherein the second predetermined portion of the weight of the milling machine is about 1200 pounds.

* * * * *